US008196819B2

(12) United States Patent
Bales, Jr. et al.

(10) Patent No.: US 8,196,819 B2
(45) Date of Patent: Jun. 12, 2012

(54) METHOD AND DEVICE FOR AUTHENTICATING ECONOMIC TRANSACTIONS

(75) Inventors: Thomas O. Bales, Jr., Coral Gables, FL (US); William Thomas Bales, Coral Gables, FL (US); Maxwell R. Bales, Coral Gables, FL (US); Gregory Oren Bales, Coral Gables, FL (US)

(73) Assignee: Euclid Laboratories, Inc., Coral Gables, FL (US)

( * ) Notice: Subject to any disclaimer, the term of this patent is extended or adjusted under 35 U.S.C. 154(b) by 295 days.

(21) Appl. No.: 12/608,798

(22) Filed: Oct. 29, 2009

(65) Prior Publication Data

US 2011/0101095 A1   May 5, 2011

(51) Int. Cl.
*G06K 5/00*   (2006.01)
(52) U.S. Cl. ................... 235/382; 235/380; 235/492
(58) Field of Classification Search ............... 235/382, 235/380, 492, 375, 377, 487
See application file for complete search history.

(56) References Cited

U.S. PATENT DOCUMENTS

| 7,240,843 | B2 * | 7/2007 | Paul et al. ........ 235/472.01 |
| 7,967,196 | B1 * | 6/2011 | Bierbaum et al. ........ 235/380 |

\* cited by examiner

*Primary Examiner* — Edwyn Labaze
(74) *Attorney, Agent, or Firm* — Mayback & Hoffman, P.A.; Gregory L. Mayback; Rebecca A. Tie (57) ABSTRACT

A method of conducting an economic transaction includes the steps of wirelessly receiving a card-transmitted signal, where the card-transmitted signal includes user account information and an indicator of an amount of elapsed time between a recognition of a vibration applied to a wirelessly-transmitting credit or debit card and a transmission of the card-transmitted signal from the card. The method further includes determining a last detected vibration at a point-of-sale device, calculating an amount of time elapsed since the identification of the last detected vibration, and comparing the amount of time elapsed since the identification of the last detected vibration with the amount of elapsed time between a recognition of a vibration applied to a card and a transmission of the card-transmitted signal from the card.

20 Claims, 6 Drawing Sheets

METHOD AND DEVICE FOR AUTHENTICATING ECONOMIC TRANSACTIONS

FIELD OF THE INVENTION

The invention lies in the field of credit card transactions and, more particularly, to account-identifying and authorization protocols.

BACKGROUND OF THE INVENTION

Credit and debit card transactions have quickly become just as prevalent, if not more prevalent, than economic transactions using standard currency. A credit card works by an issuer of a credit card lending money to a credit-card holder to make a purchase. Often billed on a monthly basis, the issuer charges interest on the lent money until the credit-card holder pays the balance in full to the issuer. Alternatively, in the case of a debit card, the purchase amount is deducted from the account-holder's bank account.

Some credit and debit card manufacturers have recently begun to use wireless transmitters on credit cards to make the purchase between a card holder and seller more efficient. No longer will a card holder have to present the physical card itself to the merchant. The wireless transmitter and wireless receiver at the Point of Sale (POS) device eliminate the need for a magnetic strip on the credit card and a magnetic strip reader from the merchant.

However, the capability of receiving information wirelessly also introduces the risk that a card in proximity to the wireless receiving POS device, which is not intended to be involved in the transaction, will erroneously transmit information and that information will be introduced into the process. For instance, an employee running a cash register may have a wallet on his or her person that contains a card with wireless-capabilities. During a transaction, where the employee is naturally in close proximity to the POS device, the employee's card may be charged by mistake. Without a further step of ensuring which card is the target of the transaction, unintended and undesirable results may occur. It would, therefore, be desirable to provide a more reliable way of authorizing credit and debit purchases over the existing art.

SUMMARY OF THE INVENTION

The present invention provides a credit authorization security system that overcomes the hereinafore-mentioned disadvantages of the heretofore-known devices of this general type.

With the foregoing and other objects in view, there is provided, in accordance with the invention, an economic transaction system that includes a transaction medium having a first vibration detector, a first clock, a memory including information identifying a financial account, a first processor communicatively coupled to the first vibration detector, the first clock, and the memory, and a transmitter communicatively coupled to the first processor. The transaction medium is able to identify, with the first vibration detector, an occurrence of a physical contact between the transaction medium and an object, calculate a first elapsed time since the occurrence of the physical contact, and transmit, with the transmitter, the first elapsed time and the information identifying the financial account.

With the objects of the invention in view, there is also provided a point-of-sale device that includes a second vibration detector, a second clock, a second processor communicatively coupled to the second vibration detector and the second clock, and a receiver communicatively coupled to the second processor. The point-of-sale device is able to identify, with the second vibration detector, an occurrence of a physical contact between the point-of-sale device and an object, calculate a second elapsed time since the occurrence of the physical contact of the point-of-sale device and the object, receive the first elapsed time from the transaction medium, and with the second processor, compare the first elapsed time to the second elapsed time and authorize a transaction if a difference between the first elapsed time and the second elapsed time is within a predetermined maximum variance.

In accordance with another feature of the invention, the point-of-sale device is operable to deny a transaction if a difference between the first elapsed time and the second elapsed time exceeds the predetermined maximum variance.

In accordance with a further feature of the invention, the transaction medium is one of a credit card, a debit card, a key fob, and an electronic device.

In accordance with an added feature of the invention, the first vibration detector is a microphone.

In accordance with an additional feature of the invention, the first clock is a counter.

In accordance with yet another feature of the invention, the transaction medium is operable to transmit, with the transmitter, the information identifying the financial account.

In accordance with yet a further feature of the invention, the point-of-sale device further includes a network connection communicatively coupling the point-of-sale device to an account-verifying entity.

In accordance with yet an added feature of the invention, the point-of-sale device is operable to receive, with the receiver, the information identifying the financial account and, upon authorizing the transaction, communicating the information identifying the financial account to the account-verifying entity over the network connection.

In accordance with again a further feature of the invention, there is also provided a method of conducting an economic transaction, where the method includes providing a transaction medium having a first vibration detector, a first clock, a memory including account information, a first processor communicatively coupled to the first vibration detector, the first clock, and the memory, and a transmitter communicatively coupled to the first processor. The method also includes providing a point-of-sale device that has a second vibration detector, a second clock, a second processor communicatively coupled to the second vibration detector and the second clock, and a receiver communicatively coupled to the second processor. The method further includes the steps of causing a physical contact between the transaction medium and the point-of-sale device, the physical contact being sufficient to create an audible vibration, identifying the audible vibration with the first vibration detector, calculating a first amount of time elapsed since the identification of the audible vibration with the first vibration detector, and transmitting the first amount of time elapsed since the identification of the audible vibration with the first vibration detector.

Although the invention is illustrated and described herein as embodied in a credit authorization security system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

BRIEF DESCRIPTION OF THE DRAWINGS

Advantages of embodiments of the present invention will be apparent from the following detailed description of the preferred embodiments thereof, which description should be considered in conjunction with the accompanying drawings in which.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. It must be noted that, as used in the specification and the appended claims, the singular forms "a," "an," and "the" include plural references unless the context clearly dictates otherwise.

While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

The present invention provides a new system to safely and efficiently transfer a card holder's account information to a vendor's POS device. The term "card" encompasses credit, charge, and debit cards, or any other type of card used to identify a user's account information. The term "vendor" includes, but is not limited to any entity; such as a merchant or other retailer, including hardware or software used thereby, that accepts card information in relation to completion or facilitation of financial transactions. The term "POS device" encompasses any economic transaction device, such as credit-card readers, ATM machines, fuel dispensers, and others.

Credit/Debit Card

Figure 1:
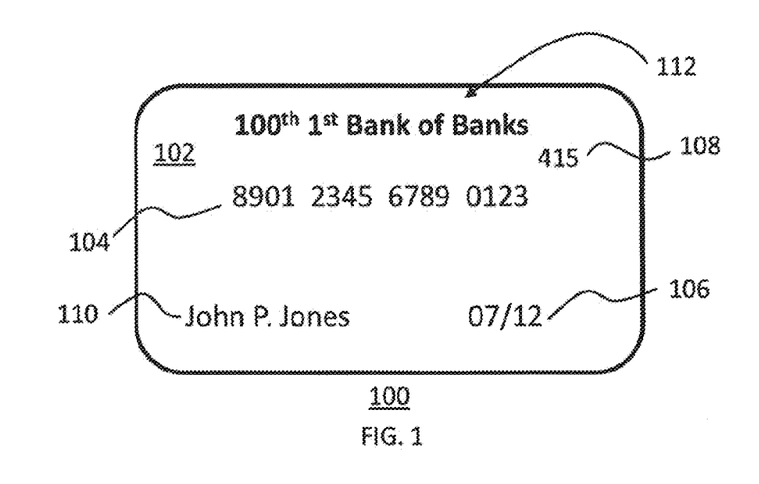
FIG. 1 is a diagrammatic illustration of a front face of an exemplary embodiment of a tap-detecting wirelessly transmitting secure economic transaction device in accordance with the present invention.

Referring now to FIG. 1, an exemplary card 100 is shown. As stated above, the term "card," is used generically herein, and is not necessarily meant to refer only to a credit card, but can include charge cards, debit cards, smart cards, microprocessor cards, and other identification-number-bearing cards of the same or different dimensions. FIG. 1 shows the front face of the card 100. In one embodiment, the card 100 is made of a medium 102, which can be, for example, plastic or other type of synthetic, and supports printed or raised characters, such as a visible account number 104, an expiration date 106, an authorization number 108, and a name 110 of the cardholder. In addition, the card can include graphics 112 that, for example, identify the card issuer or an institution to which the card is associated.

An account number 104 is created and used by an issuing institution, such as a bank, to uniquely identify the card holder and the card holder's account. Generally, each issuer type is also identified by this number. For instance, account numbers issued by AMERICAN EXPRESS are 15 digits long and account numbers issued by VISA and MASTERCARD are 16 digits long. In addition, account number formats are able to vary between issuing institutions.

To authorize a card's use, a merchant receives account information, such as the account number, so they can transmit it to the credit card issuer or some other credit verifying entity for verification of the account. This can be accomplished in several ways utilizing embodiments of the present invention, including traditional methods. A first traditional way is for the merchant to manually enter the account numbers digit by digit into the POS system. This can be accomplished by reading the visible number 104 on the front face of the card and typing the number 104 into a keypad on the payment terminal. A second traditional method to receive the account information is by swiping a magnet strip, described below, on the card across a magnetic strip reader. Both of these first two methods are well known in the art.

Figure 2:
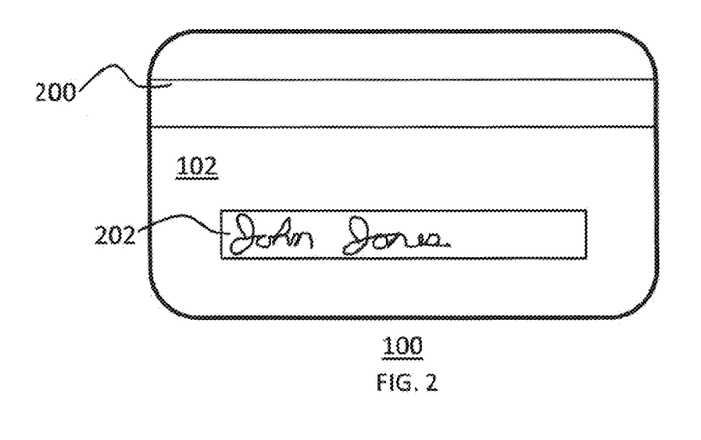
FIG. 2 is a diagrammatic illustration of a back face of an exemplary embodiment of the tap-detecting wirelessly transmitting secure economic transaction device of FIG. 1 in accordance with the present invention.

FIG. 2 shows the back side of the card 100, which includes a magnetic strip 200 attached to or integrated into the body 102. The magnetic strip 200 is encoded with the account number 104 shown on the front face or some other code that is associated with the user's account number. The POS system is provided with a magnetic strip reader that is used to capture the account number and transmit it to the credit card issuer for verification of the account. Typically, the back side of credit cards has a signature box 202. When a card is first received, the holder signs his or her name in the signature box 202. During a transaction, a merchant can compare the signature of the person completing the transaction to the signature in the signature box 202. This comparison acids a layer of security to help ensure that the person completing the transaction is actually the authorized card holder. In addition to the two traditional methods of manually entering numbers and swiping the magnetic strip 200 on the card, as just described, embodiments of the present invention advantageously also provide further methods of communicating account information to a merchant that provide greater convenience than any method currently known in the art.

Wireless Transmitter

Figure 3:
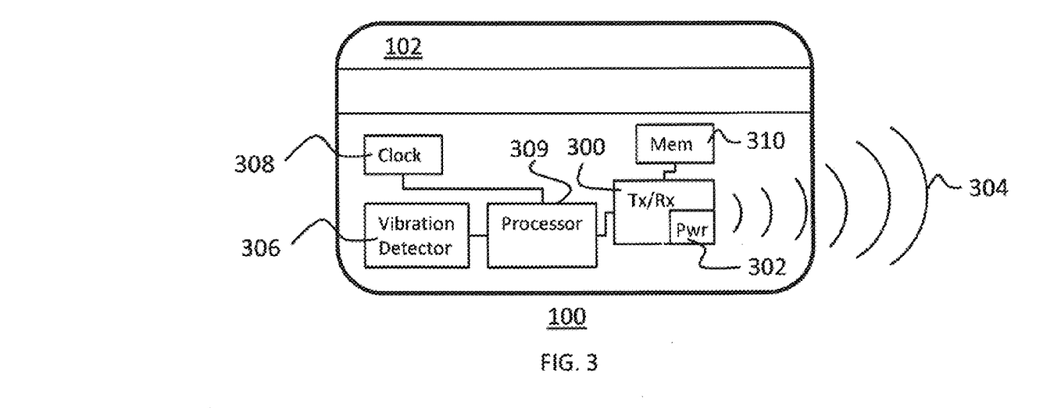
FIG. 3 is a block circuit diagram of internal circuitry of the tap-detecting wirelessly transmitting secure economic transaction device of FIGS. 1 and 2 in accordance with an exemplary embodiment of the present invention.

FIG. 3 shows the card 100 of FIGS. 1 and 2 with a wireless account information transmitting device 300 integrated into the body 102. In some embodiments of the present invention, device 300 is used as a receiving device as well. In one embodiment, the transmitter is a Radio Frequency Identification (RFID) device 300. Radio Frequency Identification (RFID) is a well-known automatic identification method, relying on storing and remotely retrieving data via RFID transponders. In this exemplary application, the data includes a credit-card holder's account information and is stored in a memory 310 provided on the card 100.

The RFID transponder device 300 has its own internal power source 302, which is used to power a clock 308 and any integrated circuits that are used to generate an outgoing radio-frequency signal 304. In one embodiment, the RFID device 300 has a practical communication range of only about 1 foot or less. This short range helps limit the number of persons/devices that are able to receive, i.e., intercept, the credit card information to those that are in the very near vicinity. However, the present invention, is not limited to any particular range. A clandestine receiver may be equipped with a more-sensitive antenna and, hence, may be able to communicate with the card or POS device over a longer distance than normally expected. The invention can, therefore, transmit at distances less than or greater than 1 foot.

In addition, the present invention provides features not present in prior-art economic-transaction systems. Specifically, the inventive card 100 includes a vibration detector 306, which is coupled to the clock 308, a processor 309, the memory 310, and the wireless account information transmitting device 300. The vibration detector 306 can be any device that senses vibrations and shock, whether acoustic or tactile, acceleration, tilt, and many others. Exemplary implementations of the vibration detector 306 include Microelectromechanical systems (MEMS) (separate or built directly into processor chips), microphones, piezoelectric crystals, and more.

POS

Figure 4:
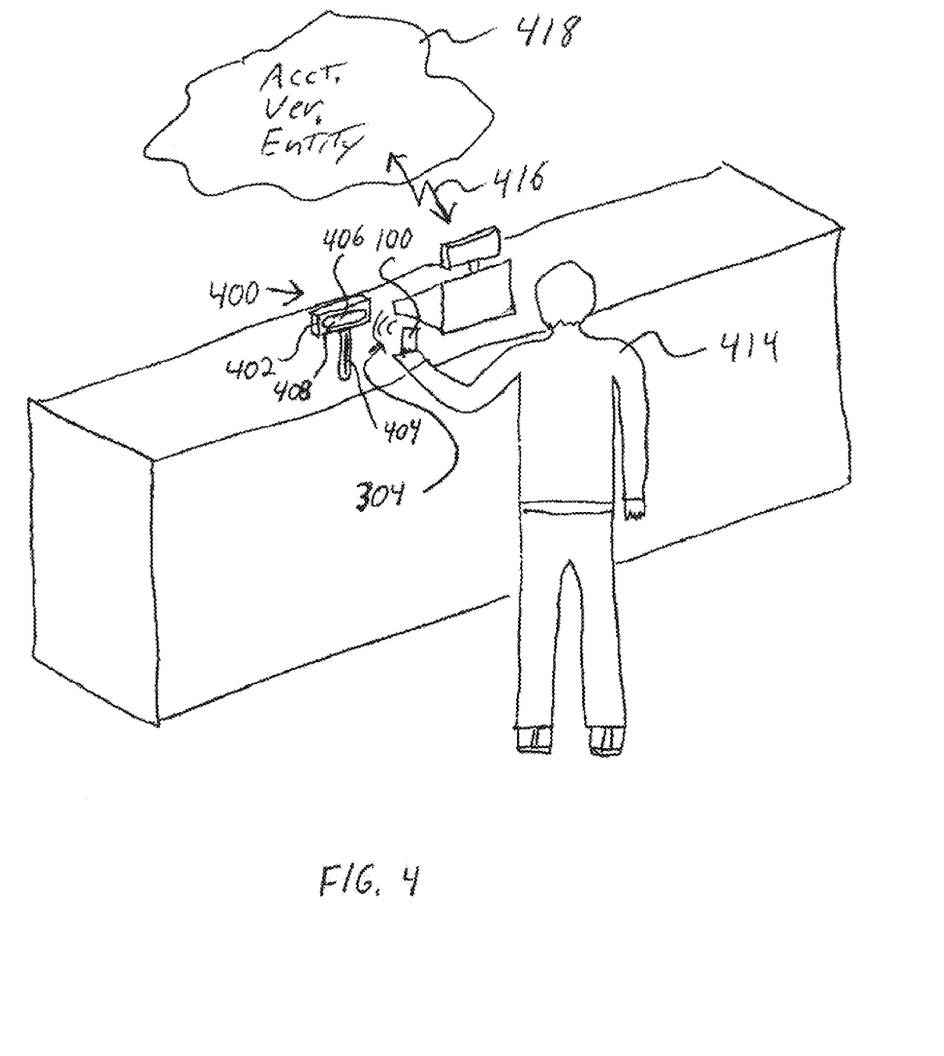
FIG. 4 is a perspective view of a tap-detecting wirelessly receiving secure economic transaction Point of Sale system in accordance with an exemplary embodiment of the present invention.

As shown in FIG. 4, the merchant is equipped with a POS system 400 that is able to wirelessly receive and interpret information from the card 100. The POS system 400 includes a housing 402 enclosing a wireless receiving antenna 404, which is capable of receiving card information transmitted by the wireless account information transmitting device 300 on the card 100. The housing 402 also includes at least a surface 406 on an area facing the customer during a transaction.

Figure 5:
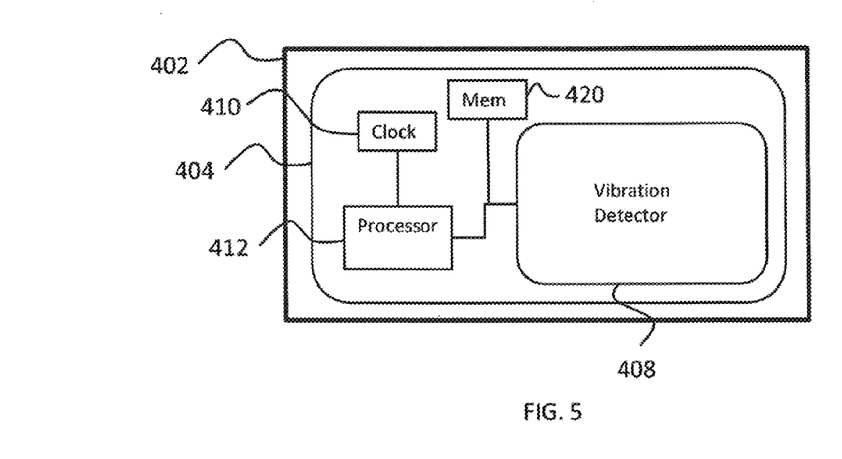
FIG. 5 is a block circuit diagram of internal circuitry of the tap-detecting wirelessly transmitting Point of Sale system of FIG. 4 in accordance with an exemplary embodiment of the present invention.

As shown in FIG. 5, also located on or within the housing 402 is a vibration detector 408, which is operable to detect the occurrence of a vibration and, in particular, a tap on the surface 406. The vibration detector 408 can be any device that senses vibrations and shock, whether acoustic or tactile, acceleration, tilt, and many others. Exemplary implementations of the vibration detector 408 include Microelectromechanical systems (MEMS) (separate or built directly into processor chips), microphones, piezoelectric crystals, and more.

The POS system 400 further includes a clock 410 and a processor 412, which includes comparative capabilities, as will be explained below.

Tapping

In operation, the vibration detector 306 within the card 100 will detect a vibration and, in particular, a tap of the card 100 against the surface 406 of the housing 402. Correspondingly, the vibration detector 408 of the housing 402 also detects the same tap. As will now be explained, the independently-recognized taps can be used to authenticate a transaction.

Figure 6:
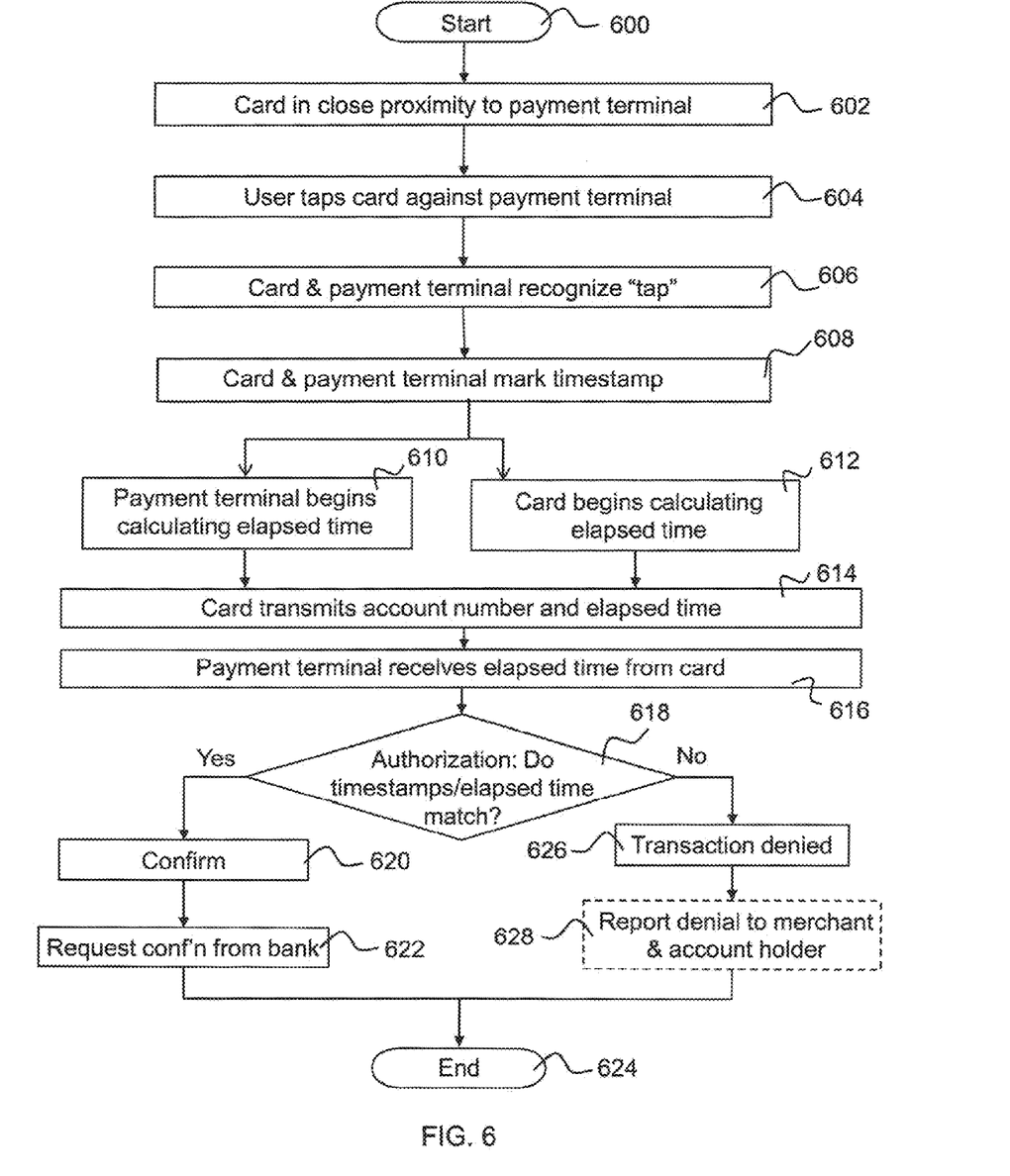
FIG. 6 is a flow diagram illustrating an exemplary process taking place during an exemplary transaction utilizing the inventive card of FIGS. 1-3 and the inventive Point of Sale system of FIGS. 4-5.

FIG. 6, in conjunction with FIGS. 3-5, show an exemplary process that takes place during an exemplary transaction utilizing the inventive card 100 and POS system 400. The flow begins at step 600 and moves directly to step 602 where a card holder 414, in physical possession of a card 100, comes within a defined proximity to a POS terminal system 400, shown in FIG. 4.

In step 604, the card holder 414 makes a brief physical contact, i.e., "taps," the card 100 against the surface 406 of the POS system 400. Upon occurrence of the tap, in step 606, both the vibration detector 306 of the card 100 and the vibration detector 408 of the POS system 400 detect the vibration. Substantially simultaneously with detecting the vibration, in step 608, both the card 100 and the POS system 400 mark a time stamp, which will provide a reference of when the tap occurred. The POS system 400, in step 610, through use of the clock 410 and the processor 412, begins counting the amount of time expired since the time stamp, i.e., since the tap occurred. In step 612, the card 100, through use of the clock 308 and processor 309, also begins counting the amount of time expired since the tap occurred.

In step 614, the transmitter 300 of the card 100 wirelessly transmits information 304 to the POS system 400. The information 308 includes the account number, i.e., credit card number, as well as a tap confirmation signal, which includes information indicating the amount of time that has expired since the tap occurred. In other embodiments, the credit card account number or other account-generating information can be transmitted separately from the transmission of the tap confirmation.

In step 616, the POS system 400 receives the information 304, including the tap confirmation. The POS system 400 then, in step 618 compares the amount of expired time, which information is contained within the tap confirmation signal 304, to the elapsed time recorded by the POS system 400 since the last tap occurred. If the times match, i.e., have the same amount of expired time and are accurate, within a predetermined amount of error, the transaction is confirmed in step 620 and the account information 416 is then transmitted, in step 622, to an account-verifying entity 418, which can be the card issuer or any agent or extension thereof, for verification that that account number is valid and that the transaction is authorized by the issuer of the card. This transmission can be wired, such as via the Internet, phone line, or any other network, or may be wireless. The process ends at step 624.

If, in step 618, the elapsed times do not match, the transaction is denied in step 626 and, as an optional step (dashed line), the failed transaction can be reported in step 628 to a relevant merchant, bank, the account holder, and/or the card holder.

The inventive tap-verifying step advantageously ensures that account information from other cards in proximity to the POS system 400 is not erroneously accepted into the transaction. If sufficient precision of corresponding tap times between the card and POS system 400 is required, the likelihood that another card near the POS system 400 will be tapped at the same time becomes virtually impossible or, at least, extremely unlikely. The present invention includes various amounts of precision between the card 100 and POS system 400 elapsed time calculations, but an error of no more than 5 milliseconds is used in at least one embodiment of the present invention. In this embodiment, if the elapsed time calculations vary by more than 5 milliseconds, the transaction is not allowed.

In one embodiment, the allowed range of time difference would be between 1 and 5 milliseconds. If the card 100 was provided with a 32 kHz clock, for instance, which is relatively slow (selected for the purpose of saving power), the frequency the "clock ticks" would be a thirtieth of a millisecond, allowing, time measurement to a precision on that order.

The present invention, however, is in no way limited to transactions using cards like credit cards. A great majority of today's card holders carry cellular telephones when making a purchase. Although numerous other electronic devices, such as MP3 players, Personal Desktop Assistants (PDA), pagers, Global Positioning System (GPS) units, and others, could be used with the present invention, the cellular telephone will be described herein as an exemplary embodiment of an alternative to the card device 100 described above.

Figure 7:
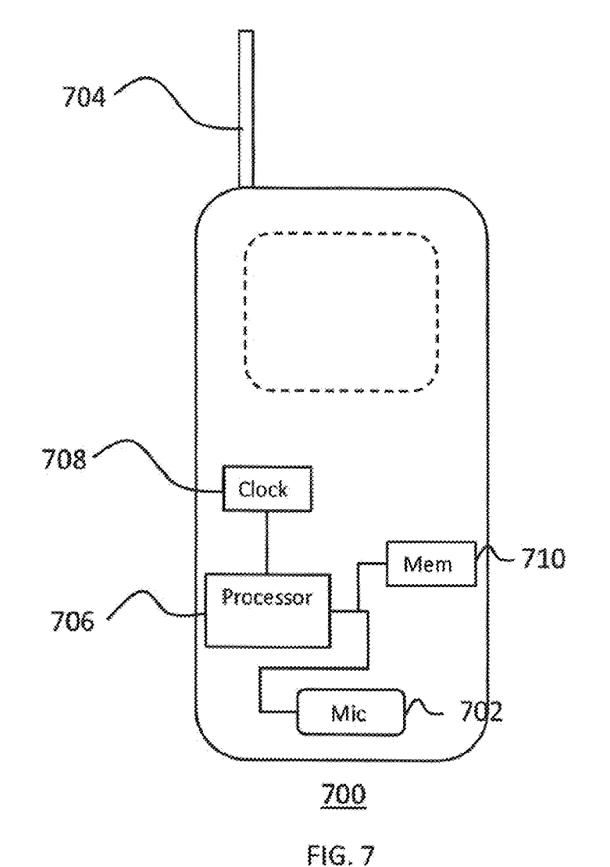
FIG. 7 is a diagrammatic illustration of a tap-detecting wirelessly transmitting secure economic transaction device in accordance with an exemplary embodiment the present invention with a block diagram of internal circuitry of the device.

As shown in FIG. 7, a cellular telephone 700 includes a built in microphone 702. As is well known in the art, a microphone 702 enables the cellular telephone 700 to convert sounds in the environment of the telephone 700 (e.g., a user's speech) into a series of electrical signals. In addition, cellular telephone 700 utilizes an antenna 704, whether internal or external (as shown), to communicate with the cellular telephone's service provider. This antenna 704 also allows the device to communicate with other electronic devices, such as the POS system 400, in addition to the cellular-telephone service provider.

FIG. 7 also shows the telephone 700 having a processor 706, a clock 708, and a memory 710—subsystems that are present in virtually every cell phone in existence. As with the credit card 100 described above, the cellular telephone 700 can, itself, be tapped against the POS system 400 to produce an audible sound. The tapping sound produced by such mechanical contact is recognized by both the cellular phone 700 and the POS system 400 substantially simultaneously. In this embodiment, the microphone 702 of the cellular telephone 700 performs the same or similar function as the vibration detector 306, which is to capture the moment of the tap. Here, microphone 702, serving as a vibration detector, and the vibration detector 408 of the POS system 400 will record an electronic signature of the tapping sound. Substantially simultaneously with detecting the vibration, both the phone 700 and the POS system 400 mark a time stamp, which will provide a reference of when the tap occurred. The POS system 400, through use of the clock 410 and the processor 412, begins counting the amount of time expired since the time stamp, i.e., since the tap occurred. The phone 700, through use of the clock 708 and processor 706, also begins counting the amount of time expired since the tap occurred.

Figure 8:
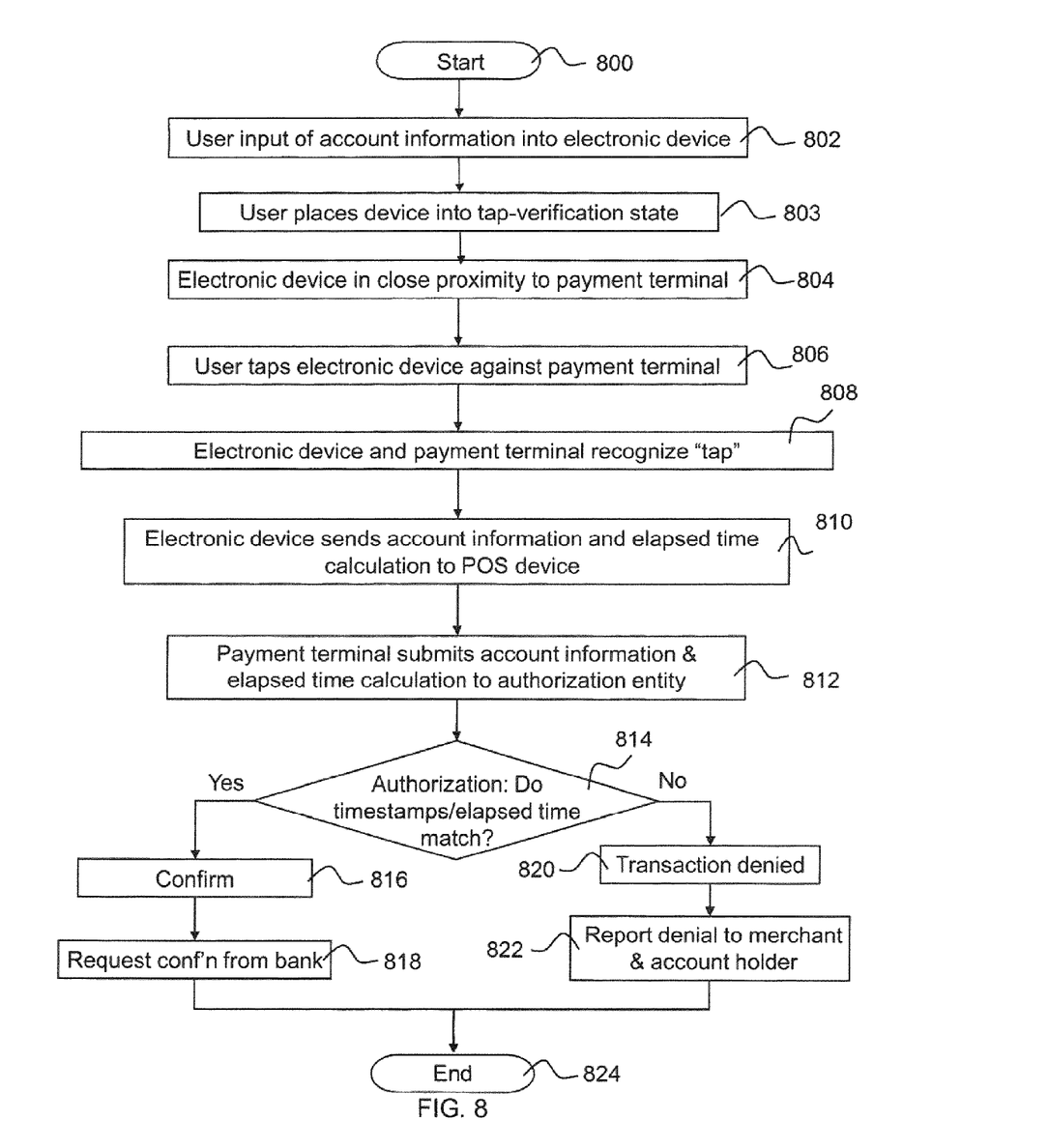
FIG. 8 is a flow diagram illustrating an exemplary process of a consumer attempting to make an authorized purchase from a merchant or retailer in accordance with the present invention.

The steps involved in a consumer attempting to make an authorized purchase from a merchant or retailer are shown in FIG. 8. The process flow starts at step 800 and progresses to step 802, where the consumer inputs his/her account information into the phone 700 or, more specifically, the memory 710 within the phone 700. It should be noted that, the cellular telephone 700 is just one of a myriad of electronic devices capable of use with the present invention and, therefore, this embodiment of the invention should not be limited to a cell phone configuration.

In step 803, the user places the device in a tap-verification state. This state-change can be performed by operation of a hard switch, soft buttons, or any other way of indicating to the device that the state should be entered. In step 804, the owner 414 of the electronic device comes in close proximity with a POS system 400. In step 806, the consumer 414 taps their cellular telephone 700 to the payment terminal 400, thereby creating an audible sound. Both the electronic device 700 and payment terminal 400 receive and record the time of the tapping sound in step 808. From a security standpoint, the fact that both vibration detectors 408, 702 located in the POS system 400 and the cellular telephone 700, respectively, hear the tapping sound and provide a subsequent comparison of the recorded times and their respective elapsed times to the time of comparison provides a novel mode of achieving secure authentication. Since the tapping creates a sound from the mechanical interaction of the cellular telephone 700 and POS system 400, both sounds will have substantially identical timestamps and, in one embodiment, audio waveforms. In this embodiment, both the POS system 400 and the cellular telephone 700 capture the actual audio waveform of the tap. A subsequent comparison of this audio waveform can be used to differentiate a second device that was tapped at the same time, but not against the same surface 406.

Once the tapping is audibly captured, the cellular telephone 700, in step 810, sends the user account information and timestamp to the POS system 400 through antenna 704. Optionally, the cellular telephone 700 can also transmit the audio signature it received at the time of the tap in step 810 as well. When the POS device 400 has both its own recorded timestamp and receives the timestamp and account information from the cellular telephone 700, in step 812, both timestamps are sent along with the user account information to an authorization service. The authorization service can be a comparison performed within the POS system 400 or can be carried out remotely at an account verifying entity 418. Again, the comparison can also include a comparison of the audio signatures of both sides of the tap that were recorded in step 808.

At step 814, the authorization service compares the two elapsed times since the tap occurred or, in some embodiments, the audible waveforms, with one being from the cellular telephone 700 and the other from the POS system 400. The comparison step determines if the elapsed time or audio signals are the same, i.e., vary by no more than an acceptable error margin, e.g., 0.5%. Various techniques known to those skilled in the art may be used to characterize the two audio signals, such as intensity-over-time, frequency-domain spectra (e.g.: fast Fourier transform processing), or other techniques of signal analysis. This margin of error may account for the amount of time it takes to transmit and receive the elapsed time value between the card 100 and the POS system 400. If the elapsed time is a match, then the process advances to step 816, whereby the authorization service confirms the successful authorization to the merchant and applies the purchase to the account information provided. The transaction by the user completes at step 818, where the request is confirmed by the bank. The process ends at step 824.

However, if at step 814 the authorization service determines that the two elapsed times vary from each other by more than the allowable variation, the transaction is denied at step 820. For example, the audible nature of sound allows for its interception by someone or some piece of electronic theft equipment within range of the sound. However, the speed of sound creates a delay in a recorded audio signature when the sound is received subsequent to the tapping. This delay provides sufficient verification information for the authenticating service to differentiate the intercepted signal, post-tapping, from the user-authorized signal that was created simultaneous to the tapping. This security measure protects the account holder and issuer from unauthorized purchases.

In addition, in the exemplary embodiment of the present invention, this denial will also trigger a notification, in step 822, to the merchant and account holder of the attempted unauthorized purchase. By sending this notification, the merchant will not proceed with the purchase and the account holder will be put on notice of the thwarted unauthorized purchase on their account so s/he can take further action. Once this notification occurs, the process ends at step 824.

The heretofore mentioned tapping/confirming technology can be implemented in many other applications including, but not limited to, automobile key fobs, locker/safe devices, gap pumps, computer terminal access devices, door knobs, and many others.

A transaction authentication system, device, method, and protocol has just been described that advantageously provides an added layer of security to economic transactions as well as to many other possible situations where access is limited to those with authorization.

We claim:

1. An economic transaction system comprising:
   a transaction medium including:
   a first vibration detector;
   a first clock;
   a memory including information identifying a financial account;
   a first processor communicatively coupled to the first vibration detector, the first clock, and the memory; and
   a transmitter communicatively coupled to the first processor,
   wherein the transaction medium is operable to:
   identify, with the first vibration detector, an occurrence of a physical contact between the transaction medium and an object;
   calculate a first elapsed time since the occurrence of the physical contact; and
   transmit, with the transmitter, the first elapsed time and the information identifying the financial account.

2. The economic transaction system according to claim 1, further comprising:
   a point-of-sale device including:
   a second vibration detector;
   a second clock;
   a second processor communicatively coupled to the second vibration detector and the second clock; and
   a receiver communicatively coupled to the second processor,
   wherein the point-of-sale device is operable to:
   identify, with the second vibration detector, an occurrence of a physical contact between the point-of-sale device and an object;
   calculate a second elapsed time since the occurrence of the physical contact of the point-of-sale device and the object;
   receive the first elapsed time from the transaction medium; and
   with the second processor:
   compare the first elapsed time to the second elapsed time; and
   authorize a transaction if a difference between the first elapsed time and the second elapsed time is within a predetermined maximum variance.

3. The economic transaction system according to claim 2, wherein the point-of-sale device is operable to deny a transaction if a difference between the first elapsed time and the second elapsed time exceeds the predetermined maximum variance.

4. The economic transaction system according to claim 2, wherein the transaction medium is one of a credit card, a debit card, a key fob, and an electronic device.

5. The economic transaction system according to claim 2, wherein the first vibration detector is a microphone.

6. The economic transaction system according to claim 2, wherein the first clock is a counter.

7. The economic transaction system according to claim 2, wherein the transaction medium is operable to transmit, with the transmitter, the information identifying the financial account.

8. The economic transaction system according to claim 7, wherein the point-of-sale device further comprises:
   a network connection communicatively coupling the point-of-sale device to an account-verifying entity.

9. The economic transaction system according to claim 8, wherein the point-of-sale device is operable to receive, with the receiver, the information identifying the financial account and, upon authorizing the transaction, communicating the information identifying the financial account to the account-verifying entity over the network connection.

10. A method of conducting an economic transaction, the method comprising:
    providing a transaction medium having:
    a first vibration detector;
    a first clock;
    a memory including account information;
    a first processor communicatively coupled to the first vibration detector, the first clock, and the memory; and
    a transmitter communicatively coupled to the first processor;
    providing a point-of-sale device having:
    a second vibration detector;
    a second clock;
    a second processor communicatively coupled to the second vibration detector and the second clock; and
    a receiver communicatively coupled to the second processor,
    causing a physical contact between the transaction medium and the point-of-sale device, the physical contact being sufficient to create an audible vibration;
    identifying the audible vibration with the first vibration detector;
    calculating a first amount of time elapsed since the identification of the audible vibration with the first vibration detector; and
    transmitting the first amount of time elapsed since the identification of the audible vibration with the first vibration detector.

11. The method of conducting an economic transaction according to claim 10, further comprising:
    identifying the audible vibration with the second vibration detector;
    calculating a second amount of time elapsed since the identification of the audible vibration with the second vibration detector;
    receiving the first amount of time elapsed; and
    comparing the first amount of time elapsed with the second amount of time elapsed.

12. The method of conducting an economic transaction according to claim 11, further comprising:
    authorizing a transaction if a difference between the first amount of time elapsed and the second amount of time elapsed is within a predetermined maximum variance.

13. The method of conducting an economic transaction according to claim 12, further comprising:
    providing a network connection communicatively coupling the point-of-sale device to an account-verifying entity.

14. The method of conducting an economic transaction according to claim 13, further comprising:

transmitting account information with the transmitter; and
receiving the account information at the point-of-sale device and, upon authorizing the transaction, communicating the account information to the account-verifying entity over the network connection.

15. The method of conducting an economic transaction according to claim 11, further comprising:
denying a transaction if a difference between the first amount of time elapsed and the second amount of time elapsed exceeds a predetermined maximum variance.

16. A method of conducting an economic transaction, the method comprising:
wirelessly receiving a card-transmitted signal, the card-transmitted signal including:
account information; and
an indicator of an amount of elapsed time between a recognition of a vibration applied to a card and a transmission of the card-transmitted signal from the card;
determining a last detected vibration;
calculating an amount of time elapsed since the identification of the last detected vibration; and
comparing the amount of time elapsed since the identification of the last detected vibration with the amount of elapsed time between a recognition of a vibration applied to a card and a transmission of the card-transmitted signal from the card.

17. The method according to claim 16, further comprising:
authorizing a transaction if a difference between the amount of time elapsed since the identification of the last detected vibration and the amount of elapsed time between a recognition of a vibration applied to a card and a transmission of the card-transmitted signal from the card is within a predetermined maximum variance.

18. The method according to claim 17, further comprising:
communicating a transaction authorization to an account-verifying entity.

19. The method according to claim 16, further comprising:
denying a transaction if a difference between the amount of time elapsed since the identification of the last detected vibration and the amount of elapsed time between a recognition of a vibration applied to a card and a transmission of the card-transmitted signal from the card is exceeds a predetermined maximum variance.

20. The method according to claim 19, further comprising:
communicating a transaction denial to an account-verifying entity.

* * * * *